(12) United States Patent
MacDonald

(10) Patent No.: US 11,597,605 B2
(45) Date of Patent: Mar. 7, 2023

(54) FLEXIBLE CONVEYOR SYSTEM

(71) Applicant: Underground Extraction Technologies Pty Ltd, Brisbane (AU)

(72) Inventor: Brian MacDonald, Brisbane (AU)

(73) Assignee: UNDERGROUND EXTRACTION TECHNOLOGIES PTY LTD, Brisbane (AU)

(*) Notice: Subject to any disclaimer, the term of this patent is extended or adjusted under 35 U.S.C. 154(b) by 0 days.

(21) Appl. No.: 17/266,393

(22) PCT Filed: Aug. 7, 2019

(86) PCT No.: PCT/AU2019/050824
§ 371 (c)(1),
(2) Date: Feb. 5, 2021

(87) PCT Pub. No.: WO2020/028946
PCT Pub. Date: Feb. 13, 2020

(65) Prior Publication Data
US 2021/0292096 A1 Sep. 23, 2021

(30) Foreign Application Priority Data
Aug. 7, 2018 (AU) .............................. 2018902865

(51) Int. Cl.
| | |
|---|---|
| *B65G 15/24* | (2006.01) |
| *B65G 21/12* | (2006.01) |
| *B65G 41/00* | (2006.01) |
| *B65G 21/10* | (2006.01) |
| *B60D 1/48* | (2006.01) |

(Continued)

(52) U.S. Cl.
CPC ......... *B65G 41/008* (2013.01); *B60D 1/481* (2013.01); *B65G 15/24* (2013.01); *B65G 21/12* (2013.01); *B65G 21/2081* (2013.01); *B65G 41/002* (2013.01); *E21F 13/02* (2013.01); *E21F 13/08* (2013.01); *B60D 2001/001* (2013.01)

(58) Field of Classification Search
None
See application file for complete search history.

(56) References Cited

U.S. PATENT DOCUMENTS 3,031,214 A * 4/1962 Horne .................... B65G 37/00
403/57
5,377,810 A 1/1995 Lehtonen
(Continued)

FOREIGN PATENT DOCUMENTS

| CN | 104058013 A | 3/2014 |
|---|---|---|
| CN | 107771155 A | 3/2018 |

*Primary Examiner* — Kavel Singh
(74) *Attorney, Agent, or Firm* — DeLio Peterson & Curcio LLC; Brian G. Schlosser

(57) ABSTRACT

The present invention relates to a flexible conveyor system. The system includes a supply conveyor module and a receiver conveyor module. A hitch mechanism is provided for pivotally coupling the supply conveyor module to the receiver conveyor module about a pivot axis so that the receiver conveyor module receives conveyed material from the supply conveyor module proximal to the pivot axis. Advantageously, the receiver conveyor module receives conveyed material from the supply conveyor module proximal to the pivot axis which impedes spillage between the adjacent conveyor modules on very tight corners.

19 Claims, 5 Drawing Sheets

(51) Int. Cl.
  *B65G 21/20*   (2006.01)
  *E21F 13/02*   (2006.01)
  *E21F 13/08*   (2006.01)
  *B60D 1/00*    (2006.01)

(56) References Cited

U.S. PATENT DOCUMENTS

| | | | | |
|---|---|---|---|---|
| 5,634,545 | A * | 6/1997 | Plumley | B65G 37/00 |
| | | | | 198/303 |
| 5,662,210 | A * | 9/1997 | Toews | B65G 15/08 |
| | | | | 198/581 |
| 10,351,361 | B2 * | 7/2019 | Bartholomew | B65G 63/008 |
| 2013/0118862 | A1 | 5/2013 | Stewart | |
| 2014/0183003 | A1 | 7/2014 | Jorgensen et al. | |

* cited by examiner

FLEXIBLE CONVEYOR SYSTEM

TECHNICAL FIELD

The present invention relates to a flexible conveyor system. The present invention has particular, although not exclusive application to a mining flexible conveyor system.

BACKGROUND

The reference to any prior art in this specification is not, and should not be taken as an acknowledgement or any form of suggestion that the prior art forms part of the common general knowledge.

Flexible conveyor systems are used in mining operations and include serially interconnected conveyor modules that convey mining material away from the cutting face for processing. In practice, a conveyor system will snake its way through mining tunnels, and there is spillage on corners when transported material passes between adjacent conveyor modules.

AU 2008202856 shows a flexible conveyor system with a first conveyor module having a hitch mechanism with a curved steel track and a rolling hitch device with rollers on opposite sides of the curved steel track. A second conveyor module is coupled so that it orbits the first conveyor module using the hitch mechanism with a view of reducing material spillage between the conveyor modules. However, there is still spillage between the modules on very tight corners as a gap forms between the tail of one convey and the head of the other.

The preferred embodiment provides a flexible conveyor system which impedes spillage between adjacent conveyor modules on very tight corners.

SUMMARY OF THE INVENTION

According to an aspect of the present invention, there is provided a flexible conveyor system including:
 a supply conveyor module;
 a receiver conveyor module; and
 a hitch mechanism for pivotally coupling the supply conveyor module to the receiver conveyor module about a pivot axis so that the receiver conveyor module receives conveyed material from the supply conveyor module, the hitch mechanism including planar inner and outer concentric rings able to rotatably slide relative to each other.

Advantageously, the receiver conveyor module may receive conveyed material from the supply conveyor module proximal to the pivot axis which impedes spillage between the adjacent conveyor modules on very tight corners.

The hitch mechanism may be planar. The hitch mechanism may define an aperture through which the conveyed material passes from the supply conveyor module to the receiver conveyor module. The aperture may be circular with the pivot axis at its centre. The hitch mechanism may include a pair of concentric rings able to rotatably slide relative to each other. The rings may include fastening tabs.

Preferably, the pivot axis is upright or vertical. The hitch mechanism may permit up to 60° pivoting in one direction, about the pivot axis, between the supply conveyor module and receiver conveyor module. Each module may include an inclined endless belt.

Each conveyor module may include a chassis. The chassis many include a frame from which a pair of hitch arms extend upwardly. The chassis may include a pivot arm between the hitch arms. The pivot arm may pivot about a horizontal axis. The chassis may include a pivot bearing in the centre of the pivot arm.

Each conveyor module may include one or more wheels. Each conveyor module may include a wheel for rotating about a vertical axis. Each conveyor may include a wheel for rotating about a longitudinal axis.

The supply conveyor module may extend above and overlap the receiver conveyor module. The system may further include a retainer for retaining material passing from the supply conveyor to the receiver conveyor. The system may further include a deflector for deflecting material from the supply conveyor module to the receiver conveyor module. The deflector may be concave. The deflector may be rotationally mounted. The system may include an arm for rotating the deflector.

In practice, the flexible conveyor system may include many of the conveyor modules coupled together with the hitch mechanisms.

According to another aspect of the present invention, there is provided a method for coupling a supply conveyor module to a receiver conveyor module of a flexible conveyor system, the method involving:
 pivotally coupling, with a coupler, the supply conveyor module to the receiver conveyor module about a pivot axis so that the receiver conveyor module receives conveyed material from the supply conveyor module, the coupler including planar inner and outer concentric rings able to rotatably slide relative to each other.

According to another aspect of the present invention, there is provided a conveyor module for coupling to a like conveyor module when forming a flexible conveyor system, the conveyor module including coupling means for pivotally coupling the conveyor module to the other conveyor module about a pivot axis so that the conveyor module receives conveyed material from the other conveyor module, the coupling means including planar inner and outer concentric rings able to rotatably slide relative to each other.

Any of the features described herein can be combined in any combination with any one or more of the other features described herein within the scope of the invention.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
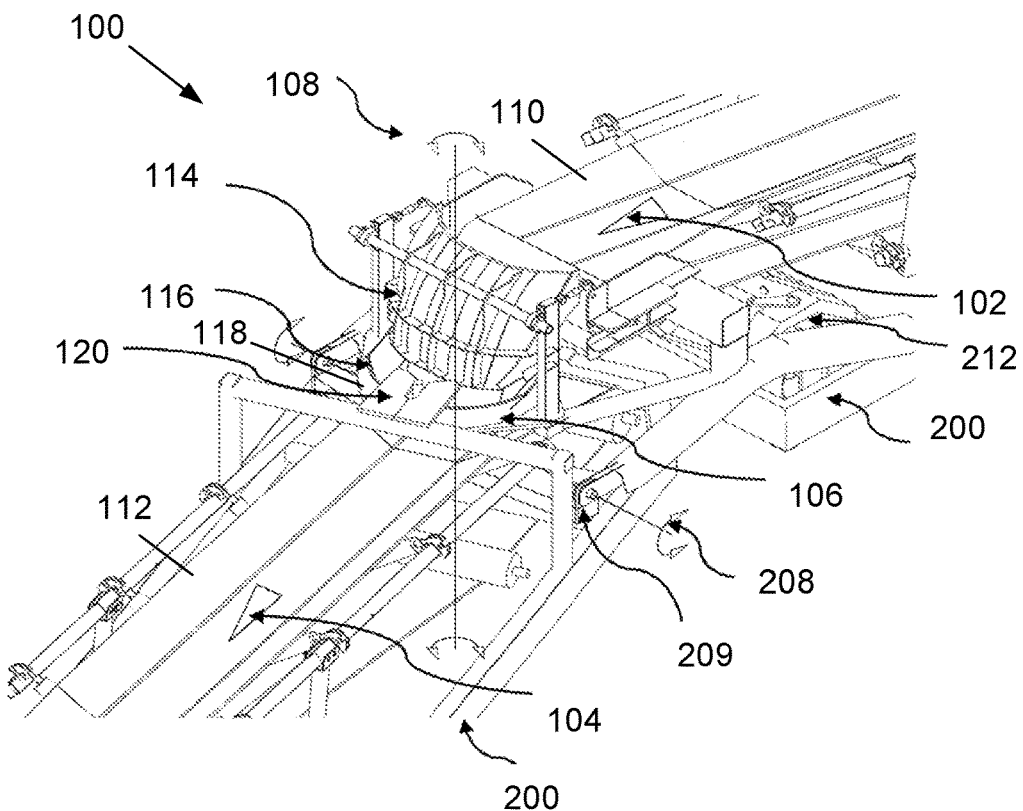
FIG. 1 is a perspective close-up of a flexible conveyor system in accordance with an embodiment of the present invention.

According to an embodiment of the present invention, there is provided a mining flexible conveyor system 100 as shown in FIG. 1. The system 100 includes a transportable supply conveyor module 102 and a like transportable receiver conveyor module 104. A hitch mechanism 106 is provided for pivotally coupling the supply conveyor module 102 to the receiver conveyor module 104 about a vertical pivot axis 108 so that the receiver conveyor module 104 receives conveyed mined material (rock, coal, ore, etc.) from the supply conveyor module 102 proximal to the pivot axis 108.

Figure 2:
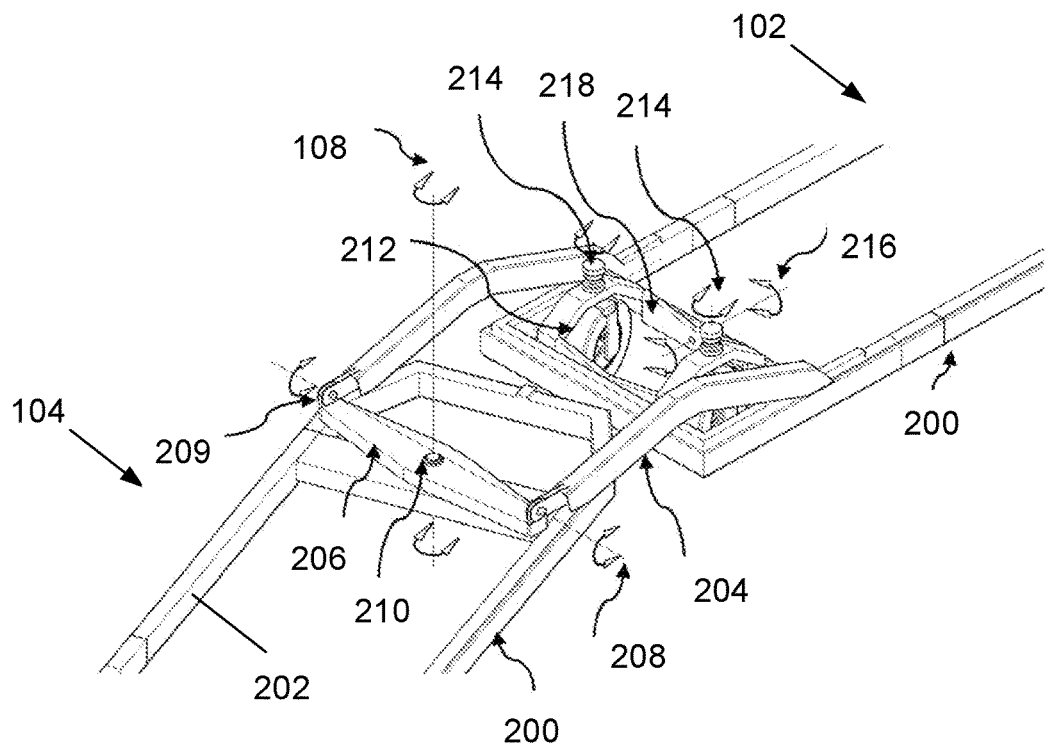
FIG. 2 is a perspective close-up of a chassis of the flexible conveyor system of FIG. 1.

Turning to FIG. 2, each conveyor module 102, 104 includes a like frame chassis 200. The chassis 200 includes a rectangular base frame 202 from which a pair of inclined hitch arms 204 extend upwardly. The chassis 200 includes a pivot arm 206 extending between the hitch arms 204. The pivot arm 206 pivots about both the vertical axis 108, and a horizontal axis 208 by virtue of end connecting pins 209. The chassis 200 further includes a pivot bearing 210 in the centre of the pivot arm 206 and co-incident with the vertical axis 108.

Each conveyor module 102, 104 further includes steering using a pair of road wheels 212. Each wheel 212 rotates about a respective vertical axis 214 and is driven by a steering actuator. One of the wheels 212 also rotates about a longitudinal axis 216 by way of bogie 218.

Returning to FIG. 1, an inclined endless belt 110 of the supply conveyor module 102 extends above and overlaps an inclined endless belt 112 of the receiver conveyor module 104. The system 100 further includes a concave hood retainer 114, fixed to the supply conveyor module 102, for retaining any errant mining material dropping from the supply conveyor module 102 to the receiver conveyor module 104.

The system 100 further includes a concave spoon deflector 116, at the base of the retainer 114, for deflecting material dropping from the supply conveyor module 102 onto the endless belt 112 of the receiver conveyor module 104. The deflector 116 is rotationally mounted on a slew ring 118 on the supply conveyor module 102. The system 100 also includes a strike arm 120 fixed on the receiver conveyor module 104 and engaged with a pin extending from the rotating spoon deflector 116.

Figure 3:
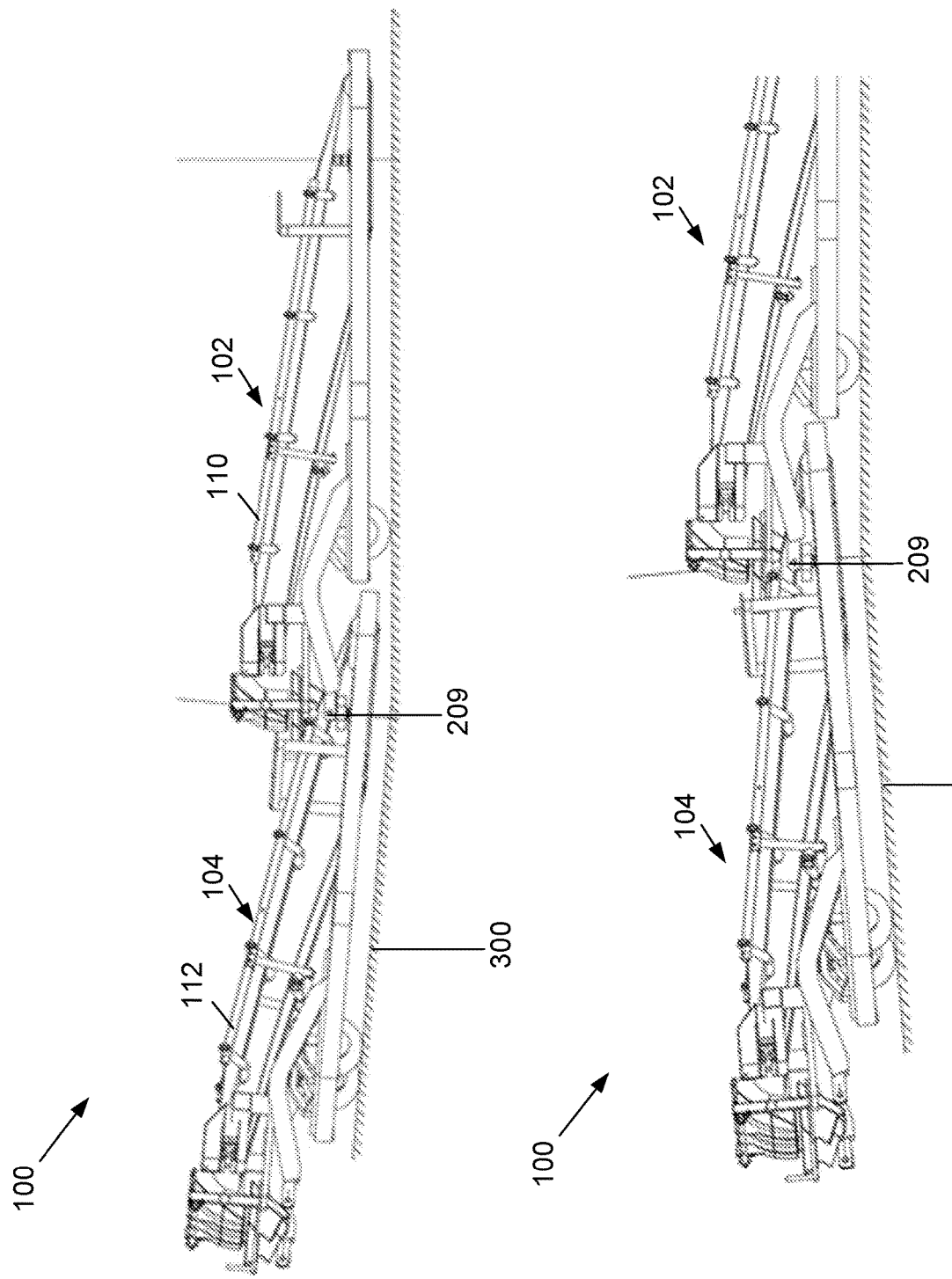
FIG. 3 shows a side view of the flexible conveyor system of FIG. 1 traversing upward and downward slopes.

As can best be seen in FIG. 3, the connecting pins 209 permit relative rotation of the modules 102, 104 in a vertical plane, about the horizontal axis 208 (into the page), when traversing an upward slope 300 or downward slope 302.

Figure 4:
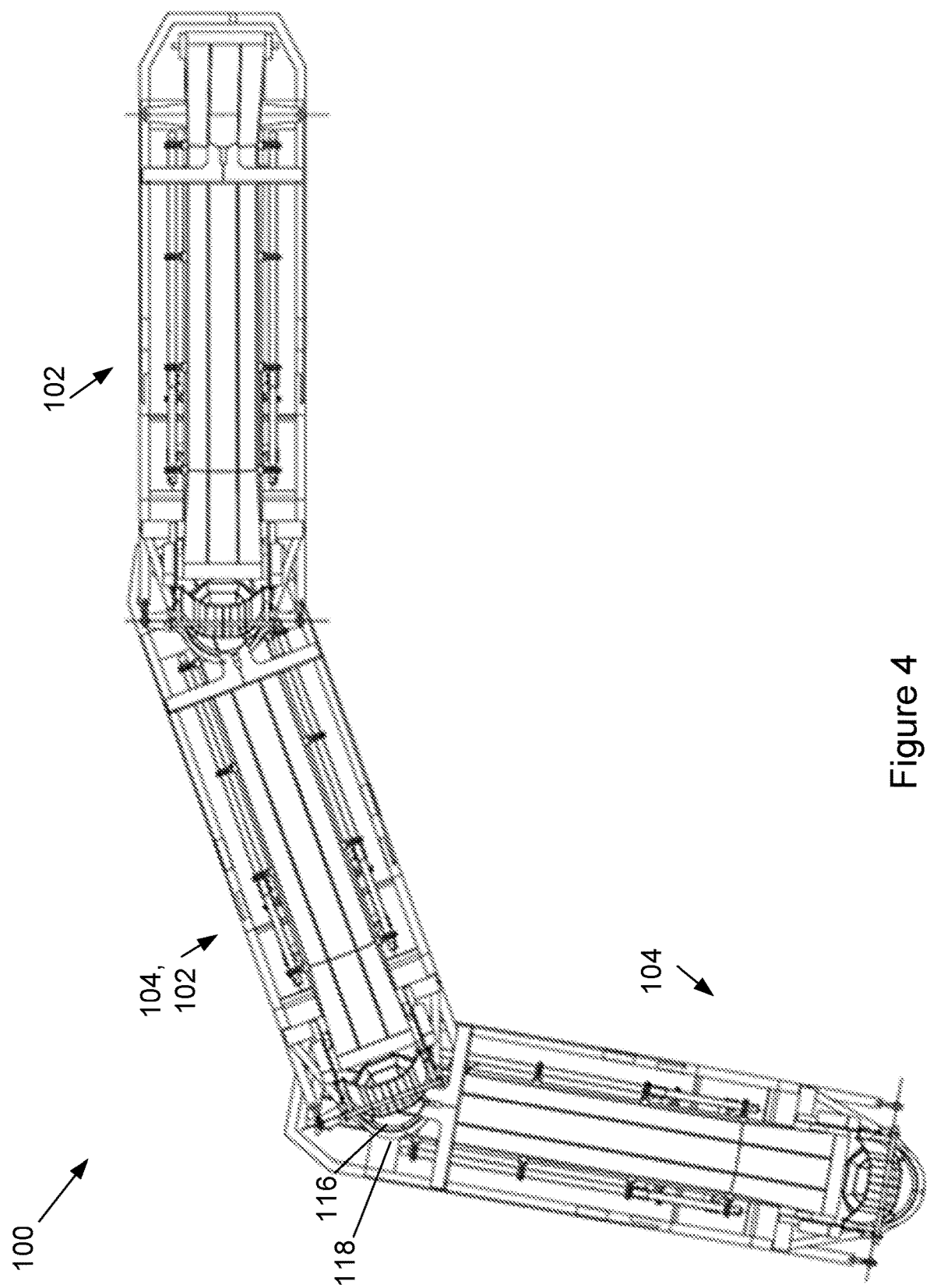
FIG. 4 is a plan view of a flexible conveyor system showing conveyor modules at differing angles when traversing a corner.

In practice, the flexible conveyor system 100 includes many of the like conveyor modules 102, 104 coupled together with the hitch mechanisms 106 to form a train. FIG. 4 shows such a system 100 traversing a corner at 20° and 60° slew angles, whereas the slew angle when modules 102, 104 form a straight line is normally 0°, and the slew ring 118 rotates in both clockwise and counterclockwise directions. As can be seen, the slew ring 118 rotates the spoon deflector 116 that continues to deflect material from the supply conveyor module 102 to the receiver conveyor module 104. Advantageously, the receiver conveyor module 104 receives conveyed material from the supply conveyor module 102 proximal to the vertical pivot axis 108 (into the page), enabling pivoting in a horizontal plane, which impedes spillage between the adjacent conveyor modules 102, 104 on very tight corners approaching 90° as there is no gaps between the conveyor modules 102, 104.

In use, the system 100 is formed by serially coupling the supply conveyor module 102 to the receiver conveyor module 104, and so on. The hitch arrangement 106 releasably pivotally couples the supply conveyor module 102 to the receiver conveyor module 104 about the vertical pivot axis 108 so that the receiver conveyor module 104 receives conveyed material from the supply conveyor module 102 proximal to the pivot axis 108 thereby minimizing material spillage.

Figure 5:
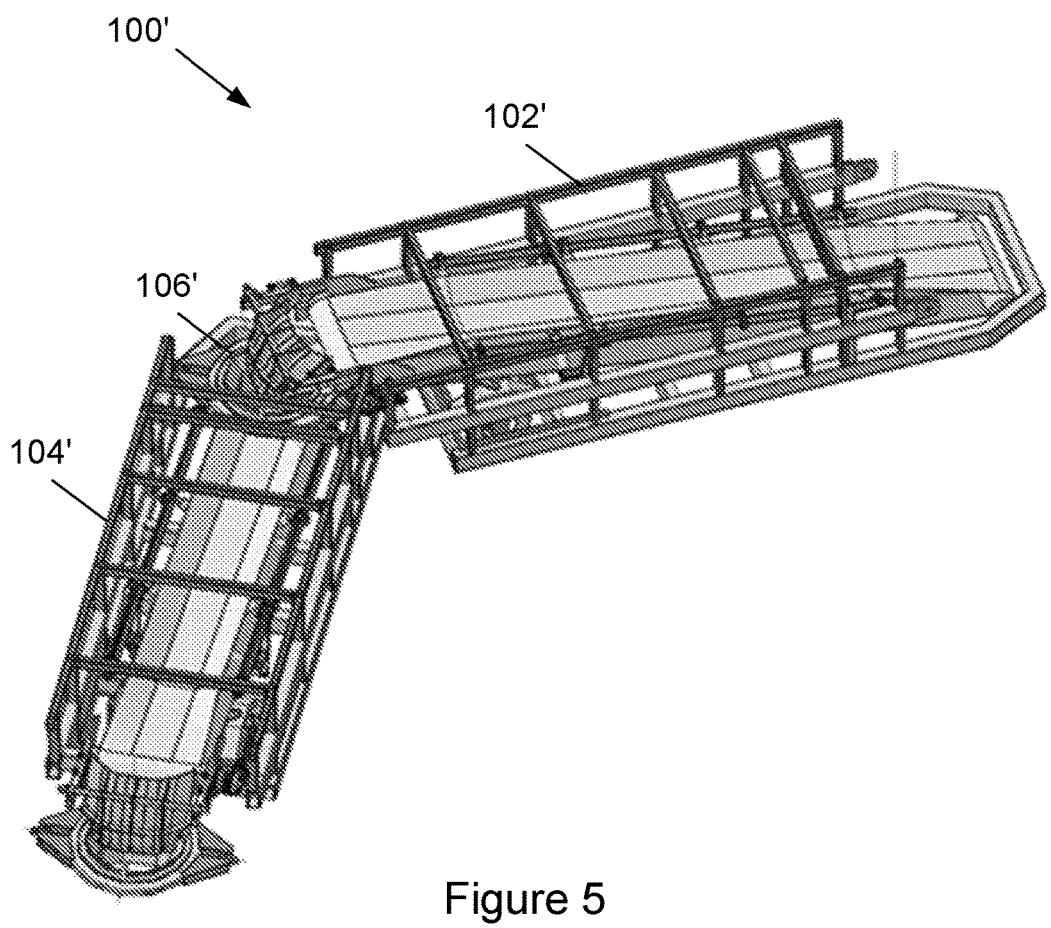
FIG. 5 is a perspective view of a flexible conveyor system in accordance with another embodiment.

FIG. 5 shows a flexible conveyor system 100' in accordance with another embodiment, where like reference numerals refer to like features previously described. The system 100' includes a planar hitch mechanism 106' for pivotally coupling the supply conveyor module 102' to the receiver conveyor module 104' about a vertical pivot axis.

Figure 6:
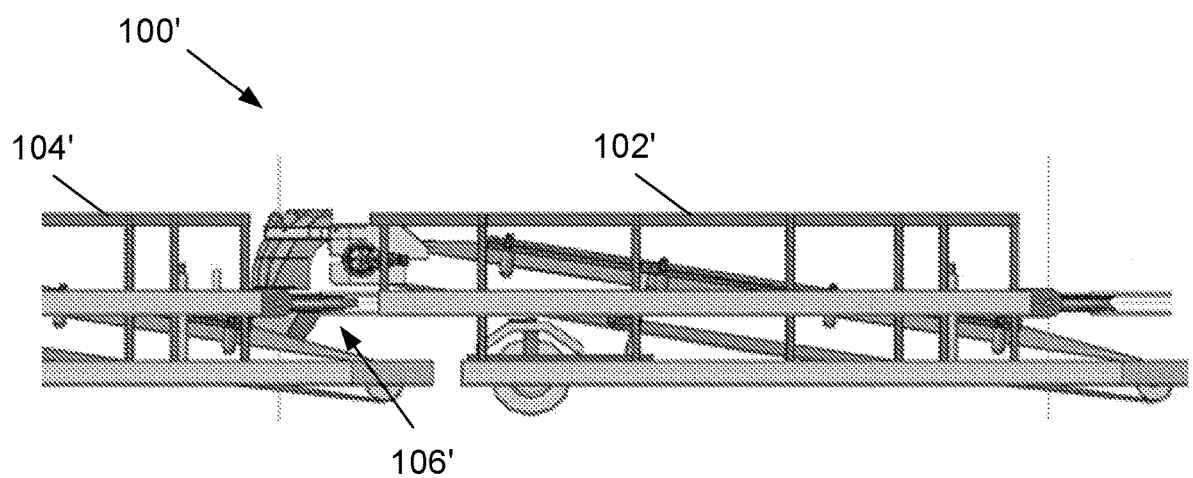
FIG. 6 is a side view of the flexible conveyor system of FIG. 5.

As can best be seen in FIG. 6, the planar nature of the hitch mechanism 106' provides a more lightweight construction than the previous hitch mechanism 106, and enables the tow forces to pass through the centre of the modules 102', 104'. Further, the planar hitch mechanism 106' reduces the height of the flexible conveyor system 100' enabling mining of a thinner seam.

Figure 7:
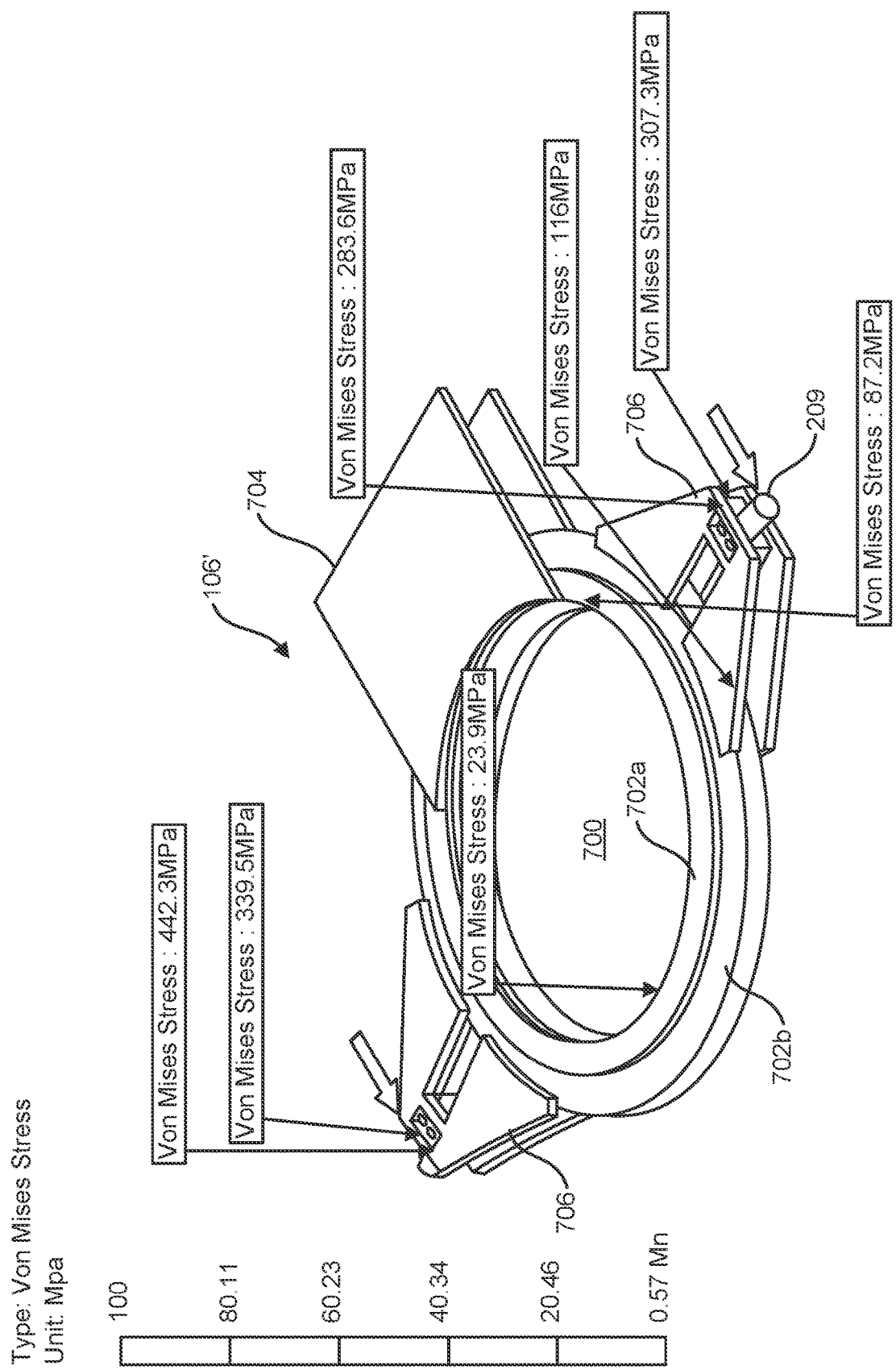
FIG. 7 is a perspective view of a hitch mechanism of the flexible conveyor system of FIG. 5.

As can best be seen in FIG. 7, the hitch mechanism 106' defines a central aperture 700 through which the conveyed material passes down from the supply conveyor module 102' to the receiver conveyor module 104'. The aperture 700 is circular with the pivot axis at its centre.

The hitch mechanism 106' includes a pair of inner and outer concentric rings 702a, 702b able to rotatably slide relative to each other. The rings 702 are typically formed from plastic or metal and have a low friction therebetween. The inner ring 702a has a pair of upper and lower fastening tabs 704. The outer ring 702b has a pair of opposed fastening tabs 706 terminating in end connecting pins 209.

A person skilled in the art will appreciate that many embodiments and variations can be made without departing from the ambit of the present invention.

In compliance with the statute, the invention has been described in language more or less specific to structural or methodical features. It is to be understood that the invention is not limited to specific features shown or described since the means herein described comprises preferred forms of putting the invention into effect.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The invention claimed is:

1. A flexible conveyor system including:
   a wheeled supply conveyor module;
   a wheeled receiver conveyor module;
   a towing hitch mechanism for pivotally coupling the wheeled supply conveyor module to the wheeled receiver conveyor module about a pivot axis so that the wheeled receiver conveyor module receives conveyed material from the wheeled supply conveyor module, the hitch mechanism including planar inner and outer concentric rings able to rotatably slide relative to each other; and wherein each conveyor module includes one or more wheels for transport along a tunnel, and the wheeled supply conveyor module tows the wheeled receiver conveyor module by way of the hitch mechanism.

2. A flexible conveyor system as claimed in claim 1, wherein the pivot axis is upright or vertical.

3. A flexible conveyor system as claimed in claim 1, wherein the hitch mechanism permits up to 60° pivoting in one direction, about the pivot axis, between the wheeled supply conveyor module and wheeled receiver conveyor module.

4. A flexible conveyor system as claimed in claim 1, wherein each wheeled module includes an inclined endless belt.

5. A flexible conveyor system as claimed in claim 1, wherein each wheeled conveyor module includes a chassis.

6. A flexible conveyor system as claimed in claim 1, wherein the hitch mechanism includes fastening tabs extending along the plane of the rings from the inner ring and between which the outer ring is located.

7. A flexible conveyor system as claimed in claim 1, further including fastening tabs extending outwardly along the plane of the rings from the outer ring.

8. A flexible conveyor system as claimed in claim 1, wherein the hitch mechanism pivots about a horizontal axis.

9. A flexible conveyor system as claimed in claim 1, wherein the hitch mechanism defines an aperture, the aperture preferably being circular with the pivot axis at its centre.

10. A flexible conveyor system as claimed in claim 1, wherein each wheeled conveyor module includes a wheel for rotating about a vertical axis.

11. A flexible conveyor system as claimed in claim 1, wherein each wheeled conveyor module includes a wheel for rotating about a longitudinal axis.

12. A flexible conveyor system as claimed in claim 1, wherein the wheeled supply conveyor module extends above and overlaps the wheeled receiver conveyor module.

13. A flexible conveyor system as claimed in claim 1, further including a retainer for retaining material passing from the wheeled supply conveyor to the wheeled receiver conveyor.

14. A flexible conveyor system as claimed in claim 1, further including a deflector for deflecting material from the wheeled supply conveyor module to the wheeled receiver conveyor module.

15. A flexible conveyor system as claimed in claim 14, wherein the deflector is concave.

16. A flexible conveyor system as claimed in claim 14, wherein the deflector is rotationally mounted and the flexible conveyor system further includes an arm for rotating the deflector.

17. A flexible conveyor system as claimed in claim 1, including more than two wheeled conveyor modules coupled together with the hitch mechanisms.

18. A method for coupling a wheeled supply conveyor module to a wheeled receiver conveyor module of a flexible conveyor system, the method involving:

pivotally coupling, with a coupler, the wheeled supply conveyor module to the wheeled receiver conveyor module about a pivot axis so that the wheeled receiver conveyor module receives conveyed material from the wheeled supply conveyor module, the coupler including planar inner and outer concentric rings able to rotatably slide relative to each other; and wherein each wheeled conveyor module includes one or more wheels for transport along a tunnel, and the wheeled supply conveyor module is able to tow the wheeled receiver conveyor module by way of the coupler.

19. A wheeled conveyor module for coupling to a like wheeled conveyor module when forming a flexible conveyor system, the wheeled conveyor module including coupling means for pivotally coupling the wheeled conveyor module to the other wheeled conveyor module about a pivot axis so that the wheeled conveyor module receives conveyed material from the other wheeled conveyor module, the coupling means including planar inner and outer concentric rings able to rotatably slide relative to each other; and wherein each wheeled conveyor module includes one or more wheels for transport along a tunnel, and the wheeled conveyor module is able to tow the other wheeled conveyor module by way of the coupling means.

\* \* \* \* \*